United States Patent [19]

Shimizu

[11] Patent Number: 5,579,137
[45] Date of Patent: Nov. 26, 1996

[54] PROCESS FOR INJECTION OF LIQUID CRYSTAL INTO AN ELECTROOPTICAL DEVICE

[75] Inventor: Michio Shimizu, Chiba, Japan

[73] Assignee: Semiconductor Energy Laboratory Co., Ltd., Kanagawa-ken, Japan

[21] Appl. No.: 471,102

[22] Filed: Jun. 6, 1995

[30] Foreign Application Priority Data

Jun. 16, 1994 [JP] Japan .................................. 6-158024

[51] Int. Cl.$^6$ ...................... G02F 1/1339; G02F 1/1341; G02F 1/1333
[52] U.S. Cl. ................................. 359/62; 359/36; 359/51; 359/80
[58] Field of Search ................................ 359/51, 62, 74, 359/80, 36

[56] References Cited

U.S. PATENT DOCUMENTS

| | | | |
|---|---|---|---|
| 5,430,564 | 7/1995 | Harada et al. | 359/80 |
| 5,477,356 | 12/1995 | Kobayashi et al. | 359/62 |
| 5,477,361 | 12/1995 | Yanagi | 359/80 |

FOREIGN PATENT DOCUMENTS

| | | | |
|---|---|---|---|
| 1-137230 | 5/1989 | Japan | 359/36 |
| 2-12122 | 1/1990 | Japan | 359/36 |

Primary Examiner—William L. Sikes
Assistant Examiner—Ron Trice
Attorney, Agent, or Firm—Sixbey, Friedman, Leedom & Ferguson, PC; Gerald J. Ferguson, Jr.; Jeffrey L. Costellia

[57] ABSTRACT

A process for fabricating a liquid crystal electro-optical device which includes injecting a liquid crystal material or a mixture of a liquid crystal material and an uncured resin material into a liquid crystal cell. The cell preferably includes, at least, a pair of light-transmitting substrates disposed opposed to each other such that the electrodes placed on the inner surfaces thereof face each other, a uniaxial aligning material provided on the inner surface of at least one of the pair of light-transmitting substrates and a sealing material for sealing the margin of the pair of light-transmitting substrates except for a filling hole. The process basically includes the steps of mounting the liquid crystal material or mixture in the vicinity of the filling hole and covering the liquid crystal material or the mixture that is mounted in the vicinity of the filling hole before injection with a sheet-like substance such that the liquid crystal material or the mixture is not covered completely. The pressure is then reduced in the inner and the surrounding atmosphere of the liquid crystal cell, the liquid crystal cell is heated and the liquid crystal material or the mixture is brought into contact with the filling hole. Then, the pressure of the atmosphere surrounding the liquid crystal cell is increased to thereby inject the liquid crystal material or the mixture.

5 Claims, 3 Drawing Sheets

5,579,137

PROCESS FOR INJECTION OF LIQUID CRYSTAL INTO AN ELECTROOPTICAL DEVICE

BACKGROUND OF THE INVENTION

The present invention relates to a process for filling a liquid crystal electro-optical device with a liquid crystal material or a mixture of a liquid crystal material and an uncured resin. The present invention also relates to a process for filling a liquid crystal electro-optical device with a liquid crystal material or a mixture of a liquid crystal material and an uncured resin, while avoiding the volatilization of low-molecular weight components such as low-molecular weight liquid crystals and uncured resins.

In general, a liquid crystal electro-optical device comprises, as the constitution thereof, a liquid crystal cell as follows.

A liquid crystal cell comprises a first substrate obtained by applying an alignment film to a substrate having thereon an electrode, baking, and subjecting the resulting substrate to an alignment treatment (referred to hereinafter as "rubbing"). A second substrate is fabricated similarly by applying an alignment film to a substrate having thereon an electrode, baking, and subjecting the resulting substrate to rubbing. The first and the second substrates thus fabricated are provided in such a manner that the electrodes thereof may be disposed opposed to each other, and a liquid crystal material is interposed between the substrates.

Depending on the liquid crystal that is used in the cell, there are cases in which an alignment film is not provided to the second substrate. In such cases, the liquid crystal material is provided directly in contact with the substrate or the electrode.

FIG. 1 shows a state of the liquid crystal cell before injecting a liquid crystal material.

Referring to FIG. 1, a liquid crystal cell comprises light-transmitting substrates 111 and 110 having thereon electrodes 112 and 113, and at least one of the substrates comprises formed thereon an aligning means 114 or 115 to align the liquid crystal in one direction. The spacing between the substrates is controlled to be uniform by means of a silica spacer 118. The substrates are fixed using a sealing material 119.

In general, a liquid crystal material is incorporated between the substrates of the liquid crystal cell by means of vacuum filling.

Vacuum filling method comprises fabricating a vacant cell with a filling hole provided in the sealing material to fill the cell with a liquid crystal material therethrough, evacuating the inside of the cell, and bringing a liquid crystal material into contact with the filling hole while maintaining the outer atmosphere at a positive pressure. The vacuum filling method is widely utilized in practice, because it is simple, and is suitable for mass production.

FIG. 2 shows the state of the liquid crystal cell after injecting a liquid crystal material.

Referring to FIG. 2, it can be seen that the molecules of the liquid crystal material 116 interposed between the substrates of the liquid crystal cell shown in FIG. 1 are aligned along the aligning means 114 and 115.

In case of vacuum filling, the vacant cell and the liquid crystal material are placed under vacuum to realize a vacuum state inside the cell to remove air from the liquid crystal material (this process is referred to hereinafter as "degassing").

More specifically, a sufficiently degassed liquid crystal material is brought into contact with the filling hole of the cell whose inside is evacuated, and the degree of vacuum is slightly lowered to increase the external atmosphere to a positive pressure. In this manner, the inside of the cell can be filled with the liquid crystal material.

A degree of vacuum necessary to obtain a vacuum cell and to degas the air inside the liquid crystal material is in a range of from $10^{-1}$ to $10^{-3}$ Torr, though depending on the size of the cell.

Widely known liquid crystal electro-optical devices include those of twisted nematic (referred to hereinafter as "TN") type or those of the super twisted nematic (referred to hereinafter as "STN") using nematic liquid crystals as the liquid crystal material. The nematic liquid crystals have high fluidity, and can be readily charged into the cell by vacuum filling at room temperature.

With increasing refresh rate and area of displays, more attention is paid to ferroelectric liquid crystals and antiferroelectric liquid crystals which respond at a rate three times as high as that of nematic liquid crystals.

The ferroelectric and the antiferroelectric liquid crystals exhibit smectic phases at room temperature, and have little fluidity. Thus, they must be fluidized so that they may be injected into the cell. Accordingly, they are heated until they exhibit a nematic phase or an isotropic phase.

Furthermore, the use of liquid crystal electro-optical devices equipped with dispersion-type liquid crystals which utilize light at higher efficiency and which are free of polarizer sheets is increasing. A liquid crystal electro-optical device of this type can be operated free of alignment films and without applying rubbing. They can be obtained by simply adhering substrates each having thereon an electrode, and interposing therebetween a resin binder with a plurality of liquid crystal particles several micrometers in diameter being dispersed therein. Although depending on the type of the liquid crystal, the liquid crystal is injected by a method similar to that used for other liquid crystals.

According to the invention of the present inventors disclosed previously, i.e., Japanese patent application No. Hei-6-45255, a method for increasing the physical strength of a liquid crystal electro-optical device is proposed, said method comprising mixing a liquid crystal material with an uncured resin material and filling the cell with the resulting mixture, wherein, the resin is separation precipitated from the liquid crystal into column-like cured products while aligning the liquid crystal material at the same time, thereby adhering the substrates to each other.

Another invention which comprises forming similarly a cured resin between the liquid crystal material and the substrate and alignment film is disclosed in Japanese patent application Nos. Hei-5-205887, Hei-5-209060, and Hei-6-80939. This invention enables ferroelectric and antiferroelectric liquid crystals to display a continuously changing intermediate gradation between a bright state and a dark one similar to that obtained on a nematic liquid crystal, and yet, without forming any domains.

The cell can be filled with a liquid crystal material described above or a mixture of a liquid crystal material and an uncured resin material (simply referred to hereinafter as a liquid crystal mixture) at room temperature if the liquid crystal material or the liquid crystal mixture exhibits excellent fluidity at room temperature. If not, the liquid crystal material or the liquid crystal mixture is heated to render fluidity thereto.

A liquid crystal material is a mixture of a plurality of liquid crystal materials, and it may contain a low molecular component having a molecular weight of about 1,000 or less. The lower molecular components tend to volatilize under vacuum, and this occurs more frequently with elevating temperature of the material.

The monomer molecules constituting the uncured resin material, however, are low molecular compounds having a very low molecular weight generally in a range of about 1,000 or less, more specifically, about 100 to 200. Accordingly, they tend to volatilize in the same manner as the low molecular components of the liquid crystal material.

However, in the vacuum filling method, the liquid crystal material or the liquid crystal mixture must be exposed to a vacuum at a degree of about $10^{-1}$ Torr in the filling step thereof. As a matter of course, the volatilization of the low molecular components was found unavoidable in this step.

The volatilization of low molecular components changes the properties of the liquid crystal material. Accordingly, this sometimes resulted in a failure in obtaining a liquid crystal material having the desired characteristics.

Furthermore, in case the concentration of the low molecular components of the uncured resin materials in the liquid crystal mixture decreases due to the volatilization thereof, the characteristics attributed to the presence of resin are sometimes found to be lost. Particularly, the intermediate gradation was found unobtainable in the second invention described above.

Thus, in the light of the aforementioned circumstances, the present invention aims to provide a process for fabricating a liquid crystal electro-optical device, which comprises injecting a liquid crystal material or a mixture thereof with a resin material by bringing it under vacuum or by heating under vacuum. The process realizes liquid crystal electro-optical devices having the desired characteristics with high reproducibility, and yet, prevents the volatilization of low molecular components of the liquid crystal material or the resin material from occurring.

SUMMARY OF THE INVENTION

The object of the present invention above can be accomplished in the following manner.

According to an aspect of the present invention, there is provided a process for fabricating a liquid crystal electro-optical device, which comprises injecting a liquid crystal material, an uncured resin material, or a mixture of a liquid crystal material and an uncured resin material by means of vacuum filling method into a space between a pair of substrates having a sealed margin except for the filling hole,
wherein, the liquid crystal material, the uncured resin material, or the mixture of a liquid crystal material and an uncured resin material that is mounted in the vicinity of the filling hole before filling the space between the substrates therewith is covered with a sheet-like substance to such a degree that the material or the mixture may not be covered completely, and is then injected by means of vacuum filling method.

According to another aspect of the present invention, there is provided a process for fabricating a liquid crystal electro-optical device, which comprises injecting a liquid crystal material or a mixture of a liquid crystal material and an uncured resin material into a liquid crystal cell comprising at least:
a pair of light-transmitting substrates disposed opposed to each other in such a manner that the electrode placed on the inner surfaces thereof may face each other;
a uniaxially aligning means provided on the inner surface of at least one of said pair of light-transmitting substrates; and
a sealing material for sealing the margin of said pair of light-transmitting substrates except for the filling hole;
wherein, the process comprises:
covering the liquid crystal material or the mixture of a liquid crystal material and an uncured resin material that is mounted in the vicinity of said filling hole before injecting it between the substrates, with a sheet-like substance to such a degree that the material or the mixture may not be covered completely;
reducing the pressure of the inner and the surrounding atmosphere of the liquid crystal cell;
bringing the liquid crystal material or the mixture of a liquid crystal material and an uncured resin material into contact with said filling hole for the liquid crystal material; and
increasing the pressure of the portion surrounding said liquid crystal cell to a positive pressure, thereby injecting the liquid crystal material or the mixture of a liquid crystal material and an uncured resin material.

According to a still other aspect of the present invention, there is provided a process for fabricating a liquid crystal electro-optical device, which comprises injecting a liquid crystal material or a mixture of a liquid crystal material and an uncured resin material into a liquid crystal cell comprising at least:
a pair of light-transmitting substrates disposed opposed to each other in such a manner that the electrode placed on the inner surfaces thereof may face each other;
a uniaxially aligning means provided on the inner surface of at least one of said pair of light-transmitting substrates; and
a sealing material for sealing the margin of said pair of light-transmitting substrates except for the filling hole;
wherein, the process comprises:
covering the liquid crystal material or the mixture of a liquid crystal material and an uncured resin material that is mounted in the vicinity of said filling hole before injecting it between the substrates, with a sheet-like substance to such a degree that the material or the mixture may not be covered completely;
reducing the pressure of the inner and the surrounding atmosphere of the liquid crystal cell;
heating the liquid crystal cell;
bringing the liquid crystal material or the mixture of a liquid crystal material and an uncured resin material into contact with said filling hole for the liquid crystal material; and
increasing the pressure of the portion surrounding said liquid crystal cell to a positive pressure, thereby injecting the liquid crystal material or the mixture of a liquid crystal material and an uncured resin material.

According to a yet other aspect of the present invention, there is provided a process for fabricating a liquid crystal electro-optical device, which comprises injecting a liquid crystal material or a mixture of a liquid crystal material and an uncured resin material into a liquid crystal cell comprising at least:
a pair of light-transmitting substrates disposed opposed to each other in such a manner that the electrode placed on the inner surfaces thereof may face each other;
a uniaxially aligning means provided on the inner surface of at least one of said pair of light-transmitting substrates; and a sealing material for sealing the margin of said pair of light-transmitting substrates except for the filling hole;

wherein, the process comprises:

covering the liquid crystal material or the mixture of a liquid crystal material and an uncured resin material that is mounted in the vicinity of said filling hole before injecting it between the substrates, with a sheet-like substance to such a degree that the material or the mixture may not be covered completely;

reducing the pressure of the inner and the surrounding atmosphere of the liquid crystal cell;

bringing the liquid crystal material or the mixture of a liquid crystal material and an uncured resin material into contact with said filling hole for the liquid crystal material by utilizing gravitational force; and increasing the pressure of the portion surrounding said liquid crystal cell to a positive pressure, thereby injecting the liquid crystal material or the mixture of a liquid crystal material and an uncured resin material.

According to a still other aspect of the present invention, there is provided a process for fabricating a liquid crystal electro-optical device, which comprises injecting a liquid crystal material or a mixture of a liquid crystal material and an uncured resin material into a liquid crystal cell comprising at least:

a pair of light-transmitting substrates disposed opposed to each other in such a manner that the electrode placed on the inner surfaces thereof may face each other;

a uniaxially aligning means provided on the inner surface of at least one of said pair of light-transmitting substrates; and a sealing material for sealing the margin of said pair of light-transmitting substrates except for the filling hole;

wherein, the process comprises:

covering the liquid crystal material or the mixture of a liquid crystal material and an uncured resin material that is mounted in the vicinity of said filling hole before injecting it between the substrates, with a sheet-like substance to such a degree that the material or the mixture may not be covered completely;

reducing the pressure of the inner and the surrounding atmosphere of the liquid crystal cell;

heating the liquid crystal cell;

bringing the liquid crystal material or the mixture of a liquid crystal material and an uncured resin material into contact with said filling hole for the liquid crystal material by utilizing gravitational force; and increasing the pressure of the portion surrounding said liquid crystal cell to a positive pressure, thereby injecting the liquid crystal material or the mixture of a liquid crystal material and an uncured resin material.

The volatilization of the low molecular components can be avoided by preventing them from being exposed directly to vacuum. On the other hand, gaseous air incorporated in the liquid crystal or the liquid crystal mixture during filling must be degassed, and the inside of the cell must be maintained under vacuum. Thus, it is required to maintain the vacant cell and the liquid crystal material or the liquid crystal mixture under vacuum.

To fulfill the conflicting requirements above, the process according to the present invention comprises adhering a sheet-like substance to the liquid crystal material or the liquid crystal mixture to cover it incompletely, in such a manner to reduce the contact area of the liquid crystal material or the liquid crystal mixture with vacuum. Vacuum filling process is effected thereafter to minimize the loss of the low molecular components of the liquid crystal material and the resin material.

FIG. 3 shows schematically a process for fabricating a liquid crystal electro-optical device according to the present invention. FIG. 4 shows a cross-sectional view taken along line A–A' given in FIG. 3.

As shown in FIG. 1, a vacant cell comprises substrates 110 and 111 fixed with each other by means of a sealing material 119. To evacuate the inside of the cell to realize a vacuum state, a liquid crystal material or a liquid crystal mixture 202 is placed in the vicinity of the filling hole 201 but in such a manner that it may not be in contact with the hole. Then, a sheet-like substance 203 is mounted on the liquid crystal material or the liquid crystal mixture 202. The sheet-like substance is not fixed to the substrate 110. As a matter of course, it may be fixed to the substrate 110. A small gap 204 is provided between the substrate 110 and the sheet-like substance 203 to degas the air from the liquid crystal material or the liquid crystal mixture through the gap.

The gap 204 can be provided at a desired portion on the liquid crystal material or the liquid crystal mixture.

There are cases in which the flow of the liquid crystal material or the liquid crystal mixture is disturbed by the presence of the sheet-like substance. In such a case, the liquid crystal material or the liquid crystal mixture may fail to contact with the filling hole even if it is heated. This can be overcome effectively by obliquely or perpendicularly tilting the liquid crystal cell. In this manner, the liquid crystal material or the liquid crystal mixture is forcibly allowed to run down to the filling hole by the gravitational force applied thereto.

The cell may be provided by tilting it previously, or by tilting it after finishing evacuation and heating.

However, if the cell is tilted previously, filling of the cell may not occur satisfactorily. More specifically, in case the liquid crystal material or the liquid crystal mixture flows down as to touch the filling hole, the cell will result in a state insufficiently filled with the liquid crystal material or the liquid crystal mixture.

Thus, by providing the gap 204 on the side opposite to that of the filling hole, the flowing down of the liquid crystal material or the liquid crystal mixture can be prevented from occurring even in case the liquid crystal cell is tilted.

Then, the fluidity of the liquid crystal material or the liquid crystal mixture can be further increased by applying heating either after sufficiently evacuating the cell or simultaneously while evacuating the cell. By tilting the substrate in this manner, the entire liquid crystal material or the liquid crystal mixture can be moved together with the sheet-like substance to the filling hole side. Thus, by increasing the outer pressure to a positive pressure, the liquid crystal material or the liquid crystal mixture can be injected inside the cell.

The sheet-like substance is preferably a material which does not absorb liquid crystals and liquid crystal mixtures.

In case of effecting a heating step, the sheet-like substance used therein preferably is resistant to heat.

Preferably, the sheet-like substance prevents wastes, etc., from being mixed into the liquid crystal material or the liquid crystal mixture.

Any sheet-like (film-like) substance satisfying the requirements above can be used in the present invention irrespective of the material. More specifically, the following substances can be used in the present invention.

A thin film (a foil) containing a metal (e.g., aluminum, gold, and silver) or carbon, silicon, etc., as the principal component; fibrous substances such as glass fibers, carbon fibers, silicon carbide fibers, aramid fibers, stainless steel fibers, as well as fibers of polyazole, polyarylate, novoloid, and polyperfluoroethylene; an organic substance (plastics and vinyl) such as polybenzimidazole, polyester, polyimide, polyimide ester, poly(vinyl chloride), polyethylene, a polymer containing quinoxaline rings, polypropylene, teflon, polyamide ester, polyphenylene oxide, polyether ketone, polyether sulfone, and polyethylene terephthalate; a rubber such as fluoride rubber, acrylic rubber, hydrin rubber, aging-preventive NBR copolymer, silicone rubber, ethylene-propylene rubber, butyl halide rubber, and a combination of tetrafluoroethylene and fluoromethyl vinyl ether; and others such as polyazole, polyarylate, novoloid, and polyperfluoroethylene.

As described in the foregoing, the process according to the present invention is characterized in that it comprises adhering a sheet onto the surface of the liquid crystal material or the liquid crystal mixture to such a degree that it may not cover the liquid crystal material or the liquid crystal mixture completely, but that the area of contact thereof with vacuum may be reduced.

By allowing the liquid crystal material or the liquid crystal mixture to stand in vacuum after providing the sheet-like substance above, the liquid crystal material or the liquid crystal mixture can be degassed because air incorporated into the liquid crystal material or the liquid crystal mixture escapes through the small gap provided between the liquid crystal material or the liquid crystal mixture and the sheet-like substance. However, because the area of the liquid crystal material or the liquid crystal mixture in contact with vacuum is reduced, the volatilization of the low molecular component can be minimized. Moreover, the volatilization of the low molecular component can be suppressed in case the entire liquid crystal material or the liquid crystal mixture is heated to elevate the temperature thereof.

By bringing the filling hole of the cell after evacuating the inside of the cell in contact with the degassed liquid crystal material or the liquid crystal mixture and increasing the pressure to a positive value, the liquid crystal material or the liquid crystal mixture is taken up into the cell. The sheet-like substance can be left free without being fixed, because there is no problem of being taken up inside the cell. Otherwise, the sheet-like substance may be fixed previously to the cell or in the vicinity of the cell.

DETAILED DESCRIPTION OF THE PRESENT INVENTION

Figure 1:
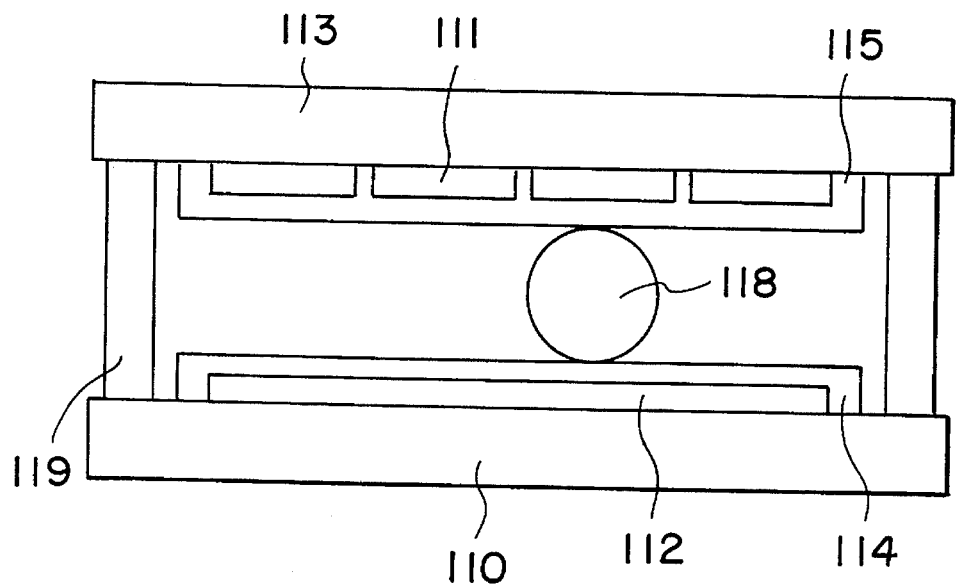
FIG. 1 shows the state of a liquid crystal cell before filling it with a liquid crystal material.
Figure 2:
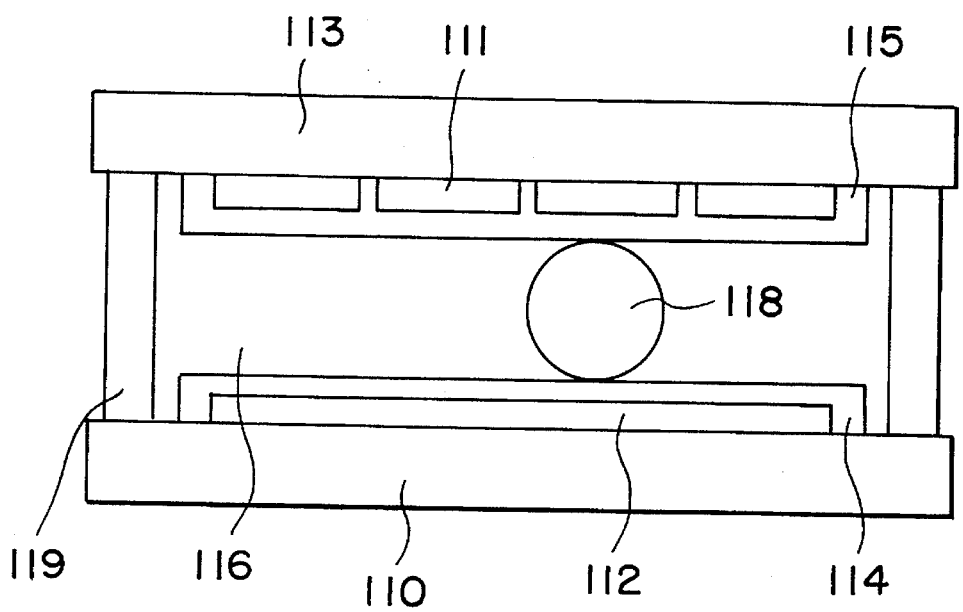
FIG. 2 shows the state of a liquid crystal cell after filling it with a liquid crystal material.
Figure 3:
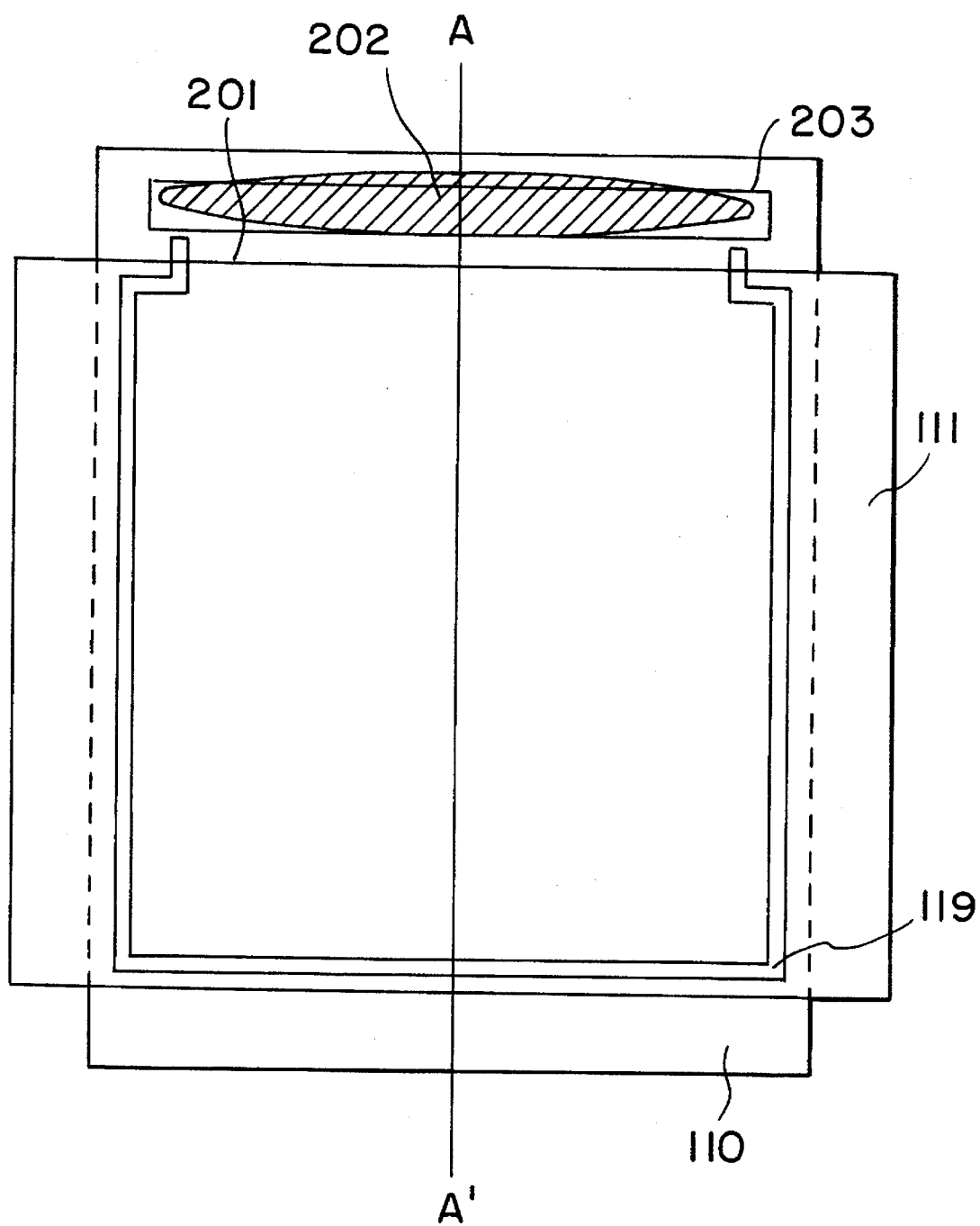
FIG. 3 shows schematically a process for fabricating a liquid crystal electro-optical device according to the present invention.
Figure 4:
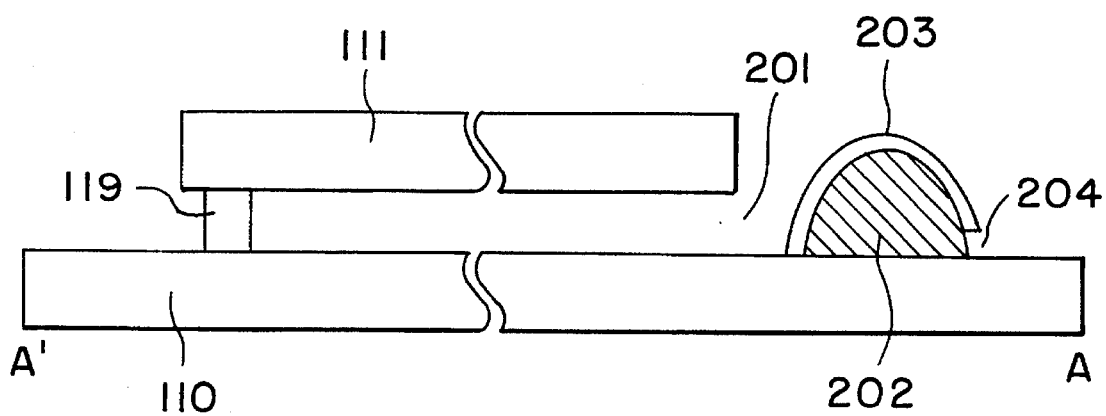
FIG. 4 shows the cross-sectional view taken along line A–A' in FIG. 3.

The present invention is described in further detail below by referring to non-limiting examples.

EXAMPLE 1

An indium-tin-oxide (abbreviated hereinafter as "ITO") film was deposited as an electrode material to a thickness of from 500 to 2,000 Å by means of sputtering or vapor deposition on a glass substrate $10 \times 10$ cm$^2$ in area. More specifically in this example, a 1,000 Å thick ITO film was deposited as the electrode, and was patterned by an ordinary process of photolithography. The resulting substrate was further coated with polyimide by means of spin-coating, and was baked at 280° C. More specifically, RN-305 (manufactured by Nissan Chemical Industries, Ltd.) or LP-64 (manufactured by Toray Industries, Inc.) was used as the polyimide. The polyimide film was provided at a thickness of from 100 to 800 Å; more specifically, 150 Å in this example. Rubbing treatment was effected on the resulting substrate for the uniaxial alignment treatment. Silica spheres (Shinshikyu; manufactured by Catalysts & Chemicals Industries Co., Ltd.) were scattered as spacers on one of the substrates, and an epoxy resin sealing material was provided to the other substrate by screen printing. A cell was then obtained by adhering the both substrates with each other while taking a spacing of about 1.5 μm therebetween.

A ferroelectric liquid crystal CS1014 (manufactured by Chisso Corporation) was used in the present example. The liquid crystal yields a Ps of 5.4 nC/cm$^2$, and undergoes a phase transition series of I (isotropic phase)-N (nematic phase)-A (smectic A phase)-C* (smectic C* phase).

A commercially available ultraviolet-radiation curable resin containing 90% of a monomer component (low molecular component having a molecular weight of 1,000 or lower) was used as the resin material for the present example.

The liquid crystal material above was mixed with the uncured resin material at a ratio of 95% to 5%, and the resulting mixture was further mixed thereafter by heating and stirring the mixture at 90° C. until the liquid crystal was found to undergo transition to isotropic phase. The resin material was mixed uniformly with the liquid crystal material in this manner to obtain a liquid crystal mixture.

The liquid crystal mixture was then placed in the form of a band in the vicinity of the filling hole of the cell, and a heat-resistant sheet containing silicone as the principal component was mounted thereon with a small gap provided therebetween. In this manner, most of the liquid crystal mixture was prevented from being in direct contact with vacuum.

The cell was placed inside a liquid crystal filling apparatus, and the inner atmosphere was evacuated to 0.1 Torr to establish a vacuum environment inside the cell and to degas the liquid crystal mixture. This vacuum atmosphere was maintained for 10 minutes. No change in vacuum degree was found during the retention.

The liquid crystal mixture was heated to 90° C., a temperature at which the liquid crystal mixture exhibits an isotropic phase, to impart fluidity thereto. Nitrogen gas was fed at a rate of 600 cc/min into the liquid crystal filling apparatus to elevate the pressure outside the cell to a positive value. In this manner, the cell was filled with the liquid crystal mixture. The cell was tilted at the same time to facilitate the liquid crystal mixture to flow down through the filling hole.

After filling the liquid crystal mixture, the liquid crystal filling apparatus was gradually cooled at a rate of from 2° to 20° C./hr. More specifically in this case, the apparatus was cooled at a rate of 2° C./hr. The alignment of the liquid crystal molecules was observed at room temperature under crossed nicols using an optical microscope. Apparently, the entire cell was uniformly charged with the resin material.

The liquid crystal material was found to be uniaxially aligned in the rubbing direction as to yield a favorable extinction angle similar to the case a liquid crystal free of a resin material was charged.

An ultraviolet (UV) radiation was then irradiated to the cell at an intensity in a range of from 3 to 30 mW/cm$^2$ and at a duration of from 0.5 to 5 minutes. More specifically in this case, the resin was cured by irradiating UV radiation at an intensity of 20 mW/cm$^2$ for a duration of 1 minute. The liquid crystal molecules after the UV irradiation were again found to align uniaxially in the rubbing direction of the alignment film as to yield a favorable extinction angle.

The change in the alignment state of the liquid crystal molecules inside the cell with changing applied voltage was observed. As a result, it was found that a continuous change in gradation from a bright state to a dark state and vice versa is obtained free of distinct domains. Thus, it enabled an intermediate gradation.

Then, the substrates of the resulting cell were pulled apart, and were allowed to stand for 5 hours inside an oven heated to 200° C. to volatilize the liquid crystal material. The substrate was observed under crossed nicols using an optical microscope to confirm no polarization occurred on the substrate. The shape of the resin on the substrate was observed using a scanning electron microscope (SEM). A plurality of fine resin protrusions about 30 nm in height and width were observed.

It can be seen therefrom that the monomer components (low molecular weight components) of the liquid crystal mixture injected into the cell by means of vacuum filling method remain without being volatilized, and that it sufficiently covers the cell.

EXAMPLE 2

A biphenyl-based ferroelectric liquid crystal in the present example. The liquid crystal yields a Ps of 20.7 nC/cm$^2$, and undergoes a phase transition series of I-A-C*.

A commercially available ultraviolet-radiation curable resin containing 70% of a monomer component (low molecular component having a molecular weight of 1,000 or lower) was used as the resin material for the present example.

The liquid crystal material above was mixed with the uncured resin material at a ratio of 95% to 5%, and the resulting mixture was further mixed thereafter by heating and stirring the mixture at 130° C. until the liquid crystal was found to undergo transition and exhibit an isotropic phase. The resin material was mixed uniformly with the liquid crystal material in this manner to obtain a liquid crystal mixture.

The liquid crystal mixture was then placed in the form of a band in the vicinity of the filling hole of the cell, and a heat-resistant sheet containing polyimide as the principal component was mounted thereon with a small gap provided therebetween. In this manner, most of the liquid crystal mixture was prevented from being in direct contact with vacuum.

The cell was placed inside a liquid crystal filling apparatus, and the inner atmosphere was evacuated to 0.1 Torr in order to establish a vacuum environment inside the cell and to degas the liquid crystal mixture. This vacuum atmosphere was maintained for 10 minutes. Meantime, no change in vacuum degree was found to occur.

The liquid crystal mixture was heated to 130° C., i.e., a temperature at which the liquid crystal mixture exhibits an isotropic phase, to impart fluidity thereto. Nitrogen gas was fed at a rate of 600 cc/min into the liquid crystal filling apparatus to elevate the pressure outside the cell to a positive value. In this manner, the cell was filled with the liquid crystal mixture. The cell may be tilted at the same time to facilitate the liquid crystal mixture to flow down through the filling hole.

After filling the liquid crystal mixture, the liquid crystal filling apparatus was gradually cooled at a rate of from 2° to 20° C./hr. More specifically in this case, the apparatus was cooled at a rate of 2° C./hr. The alignment of the liquid crystal molecules at room temperature was observed under crossed nicols using an optical microscope. Apparently, the entire cell was uniformly charged with the resin material.

When observed under crossed nicols using an optical microscope, the liquid crystal material was found to be uniaxially aligned in the rubbing direction as to yield a favorable extinction angle similar to the case a liquid crystal free of a resin material was charged.

The change in the alignment state of the liquid crystal molecules inside the cell with changing applied voltage was observed. As a result, it was found that a continuous change in gradation from a bright state to a dark state and vice versa is obtained free of distinct domains. Thus, it enabled an intermediate gradation.

Then, the substrates of the resulting cell were pulled apart, and were allowed to stand for 5 hours inside an oven heated to 280° C. to volatilize the liquid crystal material. The substrate was observed under crossed nicols using an optical microscope to confirm that no polarization occurred on the substrate. The shape of the resin on the substrate was observed using a SEM. A plurality of fine resin protrusions about 90 nm in length and about 30 nm in height and width were observed.

It can be seen therefrom that the monomer components (low molecular weight components) of the liquid crystal mixture injected into the cell by means of vacuum filling method remain without being volatilized, and that it sufficiently covers the cell.

Comparative Example 1

An apparatus having the same constitution as that described in Example 1 and the same liquid crystal mixture as that employed in Example 1 used.

The liquid crystal mixture was placed in the form of a band in the vicinity of the filling hole of the cell, but no sheet-like substance was used to cover the mixture. The liquid crystal mixture was thus placed uncovered inside the liquid crystal filling apparatus so it may be brought into direct contact with vacuum.

In the same manner as in Example 1, the inner atmosphere was evacuated to 0.1 Torr in order to establish a vacuum environment inside the cell and to degas the liquid crystal mixture. This vacuum atmosphere was maintained for 10 minutes. The vacuum valve was frequently opened and shut to control the vacuum degree in the meantime, because the vacuum degree was found to lower with passage of time. The liquid crystal mixture was heated to 90° C., i.e., a temperature at which the liquid crystal mixture exhibits an isotropic phase. Nitrogen gas was fed at a rate of 600 cc/min into the liquid crystal filling apparatus to elevate the pressure outside the cell to a positive value. In this manner, the cell was filled with the liquid crystal mixture.

After filling the liquid crystal mixture, the liquid crystal filling apparatus was gradually cooled at a rate of from 2° to 20° C./hr. More specifically in this case, the apparatus was cooled at a rate of 2° C./hr. The alignment of the liquid crystal molecules was observed at room temperature under crossed nicols using an optical microscope. Apparently, the quantity of the resin material observed over the cell was considerably less as compared with that of the cell obtained in Example 1. Moreover, resin was hardly observed in the vicinity of the filling hole. The liquid crystal material was found to be uniaxially aligned in the rubbing direction as to yield a favorable extinction angle similar to the case a liquid crystal free of a resin material was charged.

An UV radiation was then irradiated to the cell at an intensity in a range of from 3 to 30 mW/cm$^2$ and at a duration of from 0.5 to 5 minutes. More specifically in this case, the resin was cured by irradiating UV radiation at an intensity of 20 mW/cm$^2$ for a duration of 1 minute. The liquid crystal molecules after the UV irradiation were again found to align uniaxially in the rubbing direction of the alignment film as to yield a favorable extinction angle.

The change in the alignment state of the liquid crystal molecules inside the cell with changing applied voltage was observed. As a result, it was found that the state changed from a bright one to a dark one and vice versa, but by forming distinct domains. No characteristics as those obtained in Example 1, i.e., the continuously changing gradation free of domains, were obtained.

Then, the substrates of the resulting cell were pulled apart, and were allowed to stand for 5 hours inside an oven heated to 200° C. to volatilize the liquid crystal material. The substrate was observed under crossed nicols using an optical microscope to confirm no polarization occurred on the substrate. The shape of the resin on the substrate was observed using a SEM. Few resin protrusions were observed, and even fewer protrusions were found with approaching filling hole.

It can be seen therefrom that a large quantity of the monomer components (low molecular weight components) of the liquid crystal mixture charged into the cell by means of vacuum filling method volatilize upon vacuum filling, and little remain in the cell as compared with the case described in Example 1.

Comparative Example 2

The same liquid crystal material and the same resin material as those employed in Comparative Example 1 were used, except for adding 30% of the uncured resin with respect to 70% of liquid crystal.

The liquid crystal mixture was charged inside the cell in the same manner as in Comparative Example 1 without using a sheet-like substance. Thus, the cell was filled with the liquid crystal mixture while heating it at 90° C., and was cooled thereafter in the same manner as in Comparative Example 1. The alignment of the liquid crystal molecules was observed at room temperature under crossed nicols using an optical microscope. Apparently, the quantity of the resin material observed over the cell was about the same as that observed in the case of Comparative Example 1.

In this case again, the quantity of resin was observed to decrease with approaching filling hole. The liquid crystal material was found to be uniaxially aligned in the rubbing direction as to yield a favorable extinction angle similar to the case a liquid crystal free of a resin material was charged.

An UV radiation was then irradiated to the cell at an intensity of 20 mW/cm$^2$ for a duration of 1 minute to cure the resin material as in the example 1.

The change in the alignment state of the liquid crystal molecules inside the cell with changing applied voltage was observed. As a result, it was found that the state changes from a bright one to a dark one and vice versa, but by forming distinct domains. Similar to the case of Comparative Example 1, no characteristics as those obtained in Example 1, i.e., the continuously changing gradation free of domains, were reproduced.

Then, the substrates of the resulting cell were pulled apart, and were allowed to stand for 5 hours inside an oven heated to 200° C. to volatilize the liquid crystal material. The substrate was observed under crossed nicols using an optical microscope to confirm no polarization occurred on the substrate. The shape of the resin on the substrate was observed using a SEM. Few resin protrusions were observed, and even fewer protrusions were found with approaching filling hole.

Similar to the case in Comparative Example 1, it can be seen that a large quantity of the monomer components (low molecular weight components) of the liquid crystal mixture charged into the cell by means of vacuum filling method volatilize upon vacuum filling, and that only little remain in the cell.

Comparative Example 3

An apparatus having the same constitution as that described in Example 2 and the same liquid crystal mixture as that employed in Example 2 were used.

The liquid crystal mixture was placed in the form of a band in the vicinity of the filling hole of the cell, but no sheet-like substance was used to cover the mixture. The liquid crystal mixture was thus placed uncovered inside the liquid crystal filling apparatus so it may be brought into direct contact with vacuum.

In the same manner as in Example 2, the inner atmosphere was evacuated to 0.1 Torr in order to establish a vacuum environment inside the cell and to degas the liquid crystal mixture. This vacuum atmosphere was maintained for 10 minutes. The vacuum valve was frequently opened and shut to control the vacuum degree in the meantime, because the vacuum degree was found to lower with passage of time. The liquid crystal mixture was heated to 130° C., i.e., a temperature at which the liquid crystal mixture exhibits an isotropic phase. Nitrogen gas was fed at a rate of 600 cc/min into the liquid crystal filling apparatus to elevate the pressure outside the cell to a positive value. In this manner, the cell was filled with the liquid crystal mixture.

After filling the liquid crystal mixture, the liquid crystal filling apparatus was gradually cooled at a rate of from 2° to 20° C./hr. More specifically in this case, the apparatus was cooled at a rate of 2° C./hr. The alignment of the liquid crystal molecules was observed at room temperature under crossed nicols using an optical microscope. Apparently, resin was hardly observed over the entire cell. The liquid crystal material was found to be uniaxially aligned in the rubbing direction as to yield a favorable extinction angle similar to the case a liquid crystal free of a resin material was charged. An UV radiation was then irradiated to the cell at an intensity in a range of from 3 to 30 mW/cm$^2$ and at a duration of from 0.5 to 5 minutes. More specifically in this case, the resin was cured by irradiating UV radiation at an intensity of 20 mW/cm$^2$ for a duration of 1 minute. The liquid crystal molecules after the UV irradiation were again found to align uniaxially in the rubbing direction of the alignment film as to yield a favorable extinction angle.

The change in the alignment state of the liquid crystal molecules inside the cell with changing applied voltage was observed. As a result, it was found that the state changes from a bright one to a dark one and vice versa, but by forming distinct domains. No characteristics as those obtained in Example 2, i.e., the continuously changing gradation free of domains, were reproduced.

Then, the substrates of the resulting cell were pulled apart, and were allowed to stand for 5 hours inside an oven heated to 200° C. to volatilize the liquid crystal material. The substrate was observed under crossed nicols using an optical microscope to confirm no polarization occurred on the substrate. The shape of the resin on the substrate was observed using a SEM. No resin protrusions were observed over the entire substrate. Similar to the cases in Comparative Examples 1 and 2, it can be seen that a large quantity of the monomer components (low molecular weight components) of the liquid crystal mixture charged into the cell by means of vacuum filling method volatilize upon vacuum filling, and that very little remain in the cell.

As described in foregoing, the present invention enables fabrication of a liquid crystal cell by means of vacuum filling method, i.e., by filling the space between substrates with a liquid crystal material or a resin material containing a low molecular weight component. The process according to the present invention is extremely simple but reproduces the desired characteristics, and yet, prevents the volatilization of low molecular components from occurring.

Accordingly, the process according to the present invention enables fabrication of liquid crystal electro-optical devices having the preferred characteristics attributed to the presence of the liquid crystal materials and the low molecular components of the resin materials, yet at a high productivity.

The present invention is applicable to various types of liquid crystal materials, but is particularly effective for smectic liquid crystals such as the ferroelectric liquid crystals and antiferroelectric liquid crystals which require heating in case of filling the cell with the liquid crystal material. It is still more effective in case of dispersion type liquid crystal electro-optical devices in which the liquid crystal material to be incorporated between the substrates contains a resin material.

While the invention has been described in detail and with reference to specific embodiments thereof, it will be apparent to one skilled in the art that various changes and modifications can be made therein without departing from the spirit and scope thereof.

What is claimed is:

1. A process for fabricating a liquid crystal electro-optical device which comprises injecting a liquid crystal material or a mixture of a liquid crystal material and an uncured resin material by means of a vacuum filling method into a space between a pair of substrates having a sealed margin except for a filling hole, wherein the liquid crystal material or the mixture is mounted in the vicinity of the filling hole and is covered with a sheet-like substance such that the liquid crystal material or the mixture is not covered completely, and then injecting the liquid crystal material or the mixture by means of vacuum filling.

2. A process for fabricating a liquid crystal electro-optical device which comprises injecting a liquid crystal material or a mixture of a liquid crystal material and an uncured resin material into a liquid crystal cell comprising at least:

a pair of light transmitting substrates disposed opposed to each other such that the electrodes placed on the inner surfaces thereof face each other;

a uniaxial aligning means provided on the inner surface of at least one of said pair of light transmitting substrates; and a sealing material for sealing the margin of said pair of light transmitting substrates except for a filling hole;

wherein the process comprises:
mounting the liquid crystal material or the mixture in the vicinity of said filling hole;
covering the liquid crystal material or the mixture said filling hole before injection between the substrates with a sheet-like substance such that the liquid crystal material or the mixture is not completely covered;
reducing the pressure of the inner and the surrounding atmosphere of the liquid crystal cell;
bringing the liquid crystal material or the mixture into contact with said filling hole; and
increasing the pressure of the atmosphere surrounding said liquid crystal cell thereby injecting the liquid crystal material or the mixture.

3. A process for fabricating a liquid crystal electro-optical device which comprises injecting a liquid crystal material or a mixture of a liquid crystal material and an uncured resin material into a liquid crystal cell comprising at least:

a pair of light-transmitting substrates disposed opposed to each other such that the electrodes placed on the inner surfaces thereof face each other;

a uniaxial aligning means provided on the inner surface of at least one of said pair of light-transmitting substrates; and a sealing material for sealing the margin of said pair of light-transmitting substrates except for a filling hole;

wherein the process comprises:
mounting the liquid crystal material or mixture in the vicinity of said filling hole;
covering the liquid crystal material or the mixture that is mounted in the vicinity of said filling hole before injection between the substrates with a sheet-like substance such that the liquid crystal material or the mixture is not covered completely;
reducing the pressure of the inner and the surrounding atmosphere of the liquid crystal cell;
heating the liquid crystal cell;
bringing the liquid crystal material or the mixture into contact with said filling hole; and
increasing the pressure of the atmosphere surrounding said liquid crystal cell thereby injecting the liquid crystal material or the mixture.

4. A process for fabricating a liquid crystal electro-optical device which comprises injecting a liquid crystal material or a mixture of a liquid crystal material and an uncured resin material into a liquid crystal cell comprising at least:

a pair of light-transmitting substrates disposed opposed to each other such that the electrodes placed on the inner surfaces thereof face each other;

a uniaxial aligning means provided on the inner surface of at least one of said pair of light-transmitting substrates; and a sealing material for sealing the margin of said pair of light-transmitting substrates except for a filling hole;

wherein the process comprises:
mounting the liquid crystal material or the mixture in the vicinity of said filing hole;
covering the liquid crystal material or the mixture that is mounted in the vicinity of said filling hole before injection between the substrates with a sheet-like substance such that the liquid crystal material or the mixture is not covered completely;

reducing the pressure of the inner and the surrounding atmosphere of the liquid crystal cell;

bringing the liquid crystal material or the mixture into contact with said filling hole by utilizing gravity; and increasing the pressure of the atmosphere surrounding said liquid crystal cell thereby injecting the liquid crystal material or the mixture.

5. A process for fabricating a liquid crystal electro-optical device which comprises injecting a liquid crystal material or a mixture of a liquid crystal material and an uncured resin material into a liquid crystal cell comprising at least:

a pair of light-transmitting substrates disposed opposed to each other such that the electrodes placed on the inner surfaces thereof face each other;

a uniaxial aligning means provided on the inner surface of at least one of said pair of light-transmitting substrates; and a sealing material for sealing the margin of said pair of light-transmitting substrates except for a filling hole;

wherein the process comprises:

mounting the liquid crystal material or mixture in the vicinity of said filling hole;

covering the liquid crystal material or the mixture that is mounted in the vicinity of said filling hole before injection between the substrates with a sheet-like substance such that the liquid crystal material or the mixture is not covered completely;

reducing the pressure of the inner and the surrounding atmosphere of the liquid crystal cell;

heating the liquid crystal cell;

bringing the liquid crystal material or the mixture into contact with said filling hole by utilizing gravity; and increasing the pressure of the atmosphere surrounding said liquid crystal cell thereby injecting the liquid crystal material or the mixture.

* * * * *